J. F. Seiberling,
Harvester Dropper
No. 33,496.   Patented Oct. 15, 1861.

J. F. Seiberling
per Daniel Breed Atty

Witnesses
S. J. Bowen
A. Arnold

UNITED STATES PATENT OFFICE.

JOHN F. SEIBERLING, OF DOYLESTOWN, OHIO.

IMPROVEMENT IN HARVESTERS.

Specification forming part of Letters Patent No. 33,496, dated October 15, 1861.

*To all whom it may concern:*

Be it known that I, JOHN F. SEIBERLING, of Doylestown, in the county of Wayne and State of Ohio, have invented a new and useful Improvement in Harvesters; and I do hereby declare that the following is a full and exact description thereof, reference being had to the accompanying drawings, and to the letters of reference marked thereon.

Figure 2:
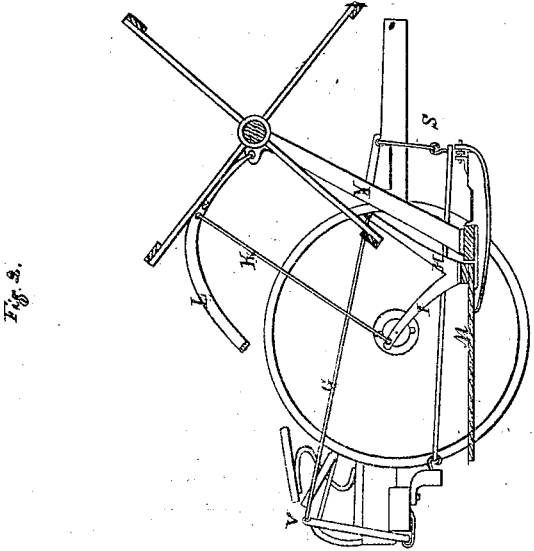
Figure 1:
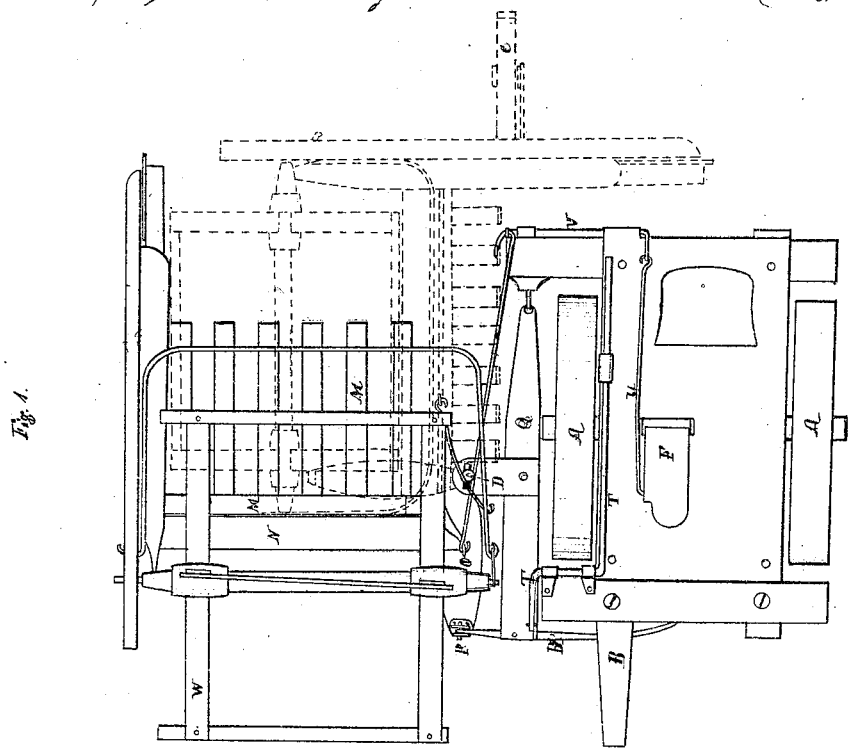

In the accompanying drawings, Figure 1 is a top view of my harvester. Fig. 2 is a section through the cutter-beam, reel, and divider, showing at the same time the arrangement of the levers, connecting-rods, treadle, &c.

My harvester is supported by two wheels, A, and drawn by the pole B, in the usual manner, the outer end of the cutter-beam being supported by a caster-wheel, C, which is capable of swinging outward, as seen in red lines, when the cutter-beam is turned back. The heel of the cutter-beam rests upon and is firmly connected with a bar, O, which is supported at one end by a pivot-joint, D, and at the other by another flexible joint, P. Both of these joints and the cutter-beam itself are supported by the bars Q and R, which are permanently connected together. These two bars are hinged to the main frame, and are also sustained by a link, S, so as to be raised or depressed at pleasure by the crooked lever T, thus elevating or lowering the cutters and heel of the cutter-beam, as desired. By removing the pin from the joint P and unhooking the rod, G the cutter-beam is left free to turn on the pivot D, so as to fold said beam and the reel backward, as seen in red lines, Fig. 2, for the purpose of passing gateways or other obstacles.

Attached to the cutter-beam is a dropper, M, for receiving the grain as it falls when cut. This dropper is hinged, so as to fall and let the grain slide off. The dropper is worked by the treadle F in connection with rod U, double-elbow lever V, rod G, and lever H. Another lever I, with rod K, operates the cut-off L, which, being lowered simultaneously with the dropper M, prevents the grain from falling upon the dropper while the latter is depositing a parcel of grain. Before the cutter-beam is folded back, as seen in red lines, Fig. 2, the dropper and also the cut-off L should be elevated, and the rod G, being unhooked, may be turned up and hooked upon the top of the cut-off.

The reel W is supported upon standards Y and Z, and may be operated by pulley or other common means.

Having thus fully described my invention, what I claim, and desire to secure by Letters Patent of the United States, is—

1. The arrangement and combination of the treadle F, rod U, elbow-lever V, rod G, and lever H for elevating and depressing the dropper M and cut-off L, (through lever I and rod H,) substantially as set forth, for the purposes described.

2. The arrangement of the hinged bars Q and R for supporting the heel of the cutter-beam and for elevating and depressing the same and the reel by means of lever T, or other device, said hinged bars being used in connection with the shoe or bar O and its flexible attachment, substantially as set forth.

3. The combination of the slotted dropper M, the cut-off L, and the finger-beam, substantially as described.

JOHN F. SEIBERLING.

Witnesses:
SAMUEL BLOCKER,
H. H. GALEHOUSE.